United States Patent
Cui et al.

(10) Patent No.: US 9,346,132 B2
(45) Date of Patent: May 24, 2016

(54) METAL CHEMISTRY FOR IMPROVED WELDABILITY OF SUPER ALLOYS

(71) Applicant: General Electric Company, Schenectady, NY (US)

(72) Inventors: Yan Cui, Greer, SC (US); Srikanth Chandrudu Kottilingam, Simpsonville, SC (US); Dechao Lin, Greer, SC (US); Brian Lee Tollison, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/602,865

(22) Filed: Jan. 22, 2015

(65) Prior Publication Data

US 2015/0129644 A1     May 14, 2015

Related U.S. Application Data

(63) Continuation-in-part of application No. 13/219,993, filed on Aug. 29, 2011, now abandoned.

(51) Int. Cl.

| | |
|---|---|
| B23K 1/00 | (2006.01) |
| C22C 19/00 | (2006.01) |
| C22C 19/03 | (2006.01) |
| B23K 35/30 | (2006.01) |
| B23K 35/02 | (2006.01) |

(Continued)

(52) U.S. Cl.
CPC ............ *B23K 35/304* (2013.01); *B23K 31/02* (2013.01); *B23K 35/0261* (2013.01); *B23K 35/3033* (2013.01); *C22C 19/056* (2013.01); *C22C 19/057* (2013.01)

(58) Field of Classification Search
CPC .......... B23K 35/3033; B23K 35/0261; B23K 35/22; B23K 9/23; C22C 19/00
See application file for complete search history.

(56) References Cited

U.S. PATENT DOCUMENTS

| | | |
|---|---|---|
| 3,479,157 A | 11/1969 | Richards et al. |
| 3,632,319 A | 1/1972 | Hoppin et al. |

(Continued)

FOREIGN PATENT DOCUMENTS

| | | |
|---|---|---|
| JP | 5659597 A | 5/1981 |
| JP | 6037270 A | 2/1985 |
| JP | 8174269 A | 7/1996 |

OTHER PUBLICATIONS

Extended European Search Report for EP Application No. 12181179.8-1215, dated Oct. 31, 2012, pp. 1-11.

(Continued)

*Primary Examiner* — Erin Saad
(74) *Attorney, Agent, or Firm* — Dority & Manning, PA

(57) ABSTRACT

A metal chemistry includes an amount of chromium weight of between about 9.0% and about 16% by weight, an amount of cobalt of between about 7.0% and about 14% by weight, an amount of molybdenum of between about 10% and about 20% by weight, an amount of iron of between about 1.0% and about 5.0% by weight, an amount of aluminum of between about 0.05% and about 0.75% by weight, an amount of titanium of between about 0.5% and about 2.0% by weight, an amount of manganese not to exceed about 0.8% by weight, an amount of carbon of between about 0.02% and about 0.10% by weight, an amount of a titanium+aluminum alloy of between about 0.55% and about 2.75% by weight, and an amount of nickel.

20 Claims, 2 Drawing Sheets

(51) Int. Cl.
    *B23K 31/02*    (2006.01)
    *C22C 19/05*    (2006.01)

(56) References Cited

U.S. PATENT DOCUMENTS

| | | | |
|---|---|---|---|
| 6,106,767 A * | 8/2000 | Kennedy | C22C 19/055 420/448 |
| 6,316,125 B1 | 11/2001 | Gaman et al. | |
| 7,165,325 B2 | 1/2007 | Imano et al. | |
| 7,451,906 B2 | 11/2008 | Dockus et al. | |
| 7,494,043 B2 | 2/2009 | Mechsner et al. | |
| 7,915,566 B2 | 3/2011 | Arjakine et al. | |
| 8,187,531 B2 | 5/2012 | Matsui et al. | |
| 2011/0142713 A1 | 6/2011 | Kawasaki et al. | |

OTHER PUBLICATIONS

Henderson et al., "Nickel-Based Superalloy Welding Practices for Industrial Gas Turbine Applications", TMS Joining, Repair and Rejuvination of Superalloys, Nov. 20, 2002, pp. 1-14.

N.A., "EOS NickelAlloy IN625", EOS GmbH Electro Optical Systems, Oct. 2010, pp. 1-6.

N.A., "Nicrofer 5120 CoTi—alloy C-263", Material Data Sheet No. 4020, Feb. 1993, pp. 1-10.

Sampath, K., Transverse-Weld Tensile Properties of a New Al—4Cu—2Si Alloy as Filler Metal, Journal of Materials Engineering and Performance, vol. 18, No. 9, Dec. 2009, pp. 1218-1225.

Yang et al., "Fusion-Boundary Macrosegregation in Dissimilar-Filler Metal Al—Cu Welds", Welding Journal, Nov. 2007, vol. 86, pp. 331-339.

* cited by examiner

METAL CHEMISTRY FOR IMPROVED WELDABILITY OF SUPER ALLOYS

CROSS-REFERENCE TO RELATED APPLICATION

This application is a continuation-in-part of U.S. application Ser. No. 13/219,993 filed Aug. 29, 2011, the disclosure of which is incorporated by reference herein in its entirety.

BACKGROUND OF THE INVENTION

The subject matter disclosed herein relates to the art of metal joining and, more particularly, to a metal chemistry for joining components.

High strength and oxidation resistant alloys such as nickel-based super alloys are widely used in the construction of turbomachines. Super alloys possess strength, weight, durability, and temperature properties desirable for use in many turbomachine components. However, in general, super alloys have poor fusion weldability due to a tendency for liquation cracking and strain age cracking (SAC). SAC is closely related to gamma prime volume fraction, which is a function of Aluminum (Al) and titanium (Ti) content. An increase in the gamma prime fraction and, in particular Al content, increases the tendency for SAC. SAC generally occurs in a weld metal adjacent to a fusion boundary (WMATFB) region and/or propagates into a heat-affected zone (HAZ) of a base metal. Material in the WMATFB region includes base metal resulting from dilution and filler metal added during welding. As such, the WMATFB region should include a chemistry that falls within a weldable material region to avoid, or at least lower, a tendency towards SAC.

If the WMATFB region chemistry falls within the weldable material region, cracking tendency is low. In a tungsten inert gas (TIG) welding process for example, a typical dilution ratio is about 30:70 which means 30% of the WMATFB region includes base metal and 70% of the WMATFB region includes filler metal. Accordingly, filler metal for welding a particular alloy should possess certain chemical composition and mechanical properties at elevated temperatures.

BRIEF DESCRIPTION OF THE INVENTION

According to one aspect of the exemplary embodiment, a metal chemistry includes an amount of chromium weight of between about 9.0% and about 16% by weight, an amount of cobalt of between about 7.0% and about 14% by weight, an amount of molybdenum of between about 10% and about 20% by weight, an amount of iron of between about 1.0% and about 5.0% by weight, an amount of aluminum of between about 0.05% and about 0.75% by weight, an amount of titanium of between about 0.5% and about 2.0% by weight, an amount of manganese not to exceed about 0.8% by weight, an amount of carbon of between about 0.02% and about 0.10% by weight, an amount of a titanium+aluminum alloy of between about 0.55% and about 2.75% by weight, and an amount of nickel.

According to another aspect of the exemplary embodiment, a method of joining metals includes joining a first alloy to a second alloy using a filler metal including an amount of chromium of between about 9.0 and about 16% by weight, an amount of cobalt by weight of between about 7.0% and about 14% by weight, an amount of molybdenum of between about 10% and about 20% by weight, an amount of iron of between about 1.0% and about 5.0% by weight, an amount of aluminum of between about 0.05% and about 0.75% by weight, an amount of titanium of between about 0.5% and about 2.0% by weight, an amount of manganese not to exceed about 0.8% by weight, an amount of carbon of between about 0.02% and about 0.10% by weight, an amount of a titanium+aluminum alloy of between about 0.55% and about 2.75% by weight, and an amount of nickel.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Substrates, particularly surfaces of turbomachinery, develop pits, cavities and the like. Impurities carried by inlet air, or developed by combustion pass through various portions of a turbomachine. The impurities often times become deposited on internal turbomachine surfaces and, over time, eventually form pits, cavities or the like. Other impurities may create cavities or pits by impacting the internal surfaces at high velocity. If the size of the cavity or pit exceeds a desired threshold, the substrate must be repaired or replaced. Repairing the substrate is desirable due to the high cost of turbomachine components.

Figure 1:
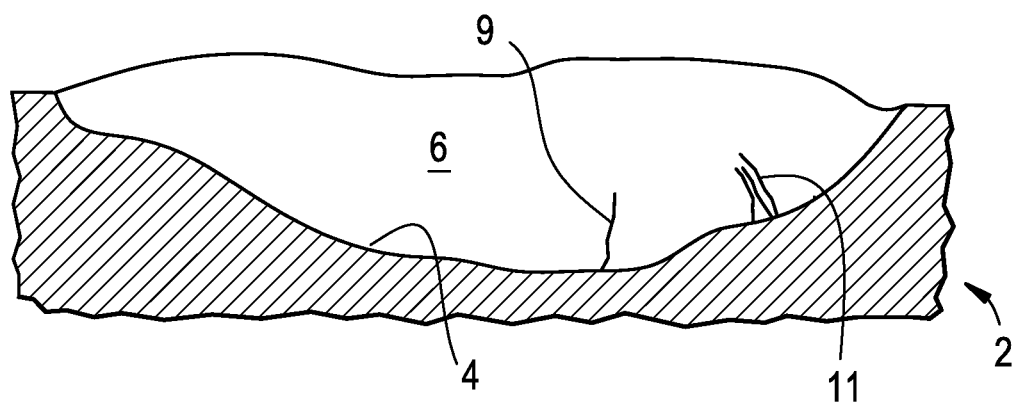
FIG. 1 is a partial cross-sectional view of a substrate having a cavity filled with metal in accordance with the prior art.

Previously, cavities and/or pits having a diameter greater than about 0.250" were considered unrepairable. Current metal chemistry, limits repair to cavities under 0.250". Cavities over 0.250" could not be properly repaired without experiencing cracks that could lead to component failure or turbomachine damage. For example, as shown in FIG. 1, a substrate 2 includes a cavity 4 having a diameter of approximately 0.54". Cavity 4 is filled with a prior art metal 6 which, in the exemplary embodiment shown, takes the form of a super alloy H230. Poor fusion weldability between metal 6 and substrate 2 resulted in strain age cracking (SAC). The SAC occurred in metal 6 adjacent to a weld metal fusion boundary (WMATFB) region or the region between metal 6 and substrate 2. As shown, the SAC resulted in the formation of cracks 9 and 11 having a length that exceeds desired parameters. Cracks of such magnitude could result in metal 6 becoming dislodged from cavity 4. If dislodged, metal 6 may cause damage to turbomachine components.

Figure 2:
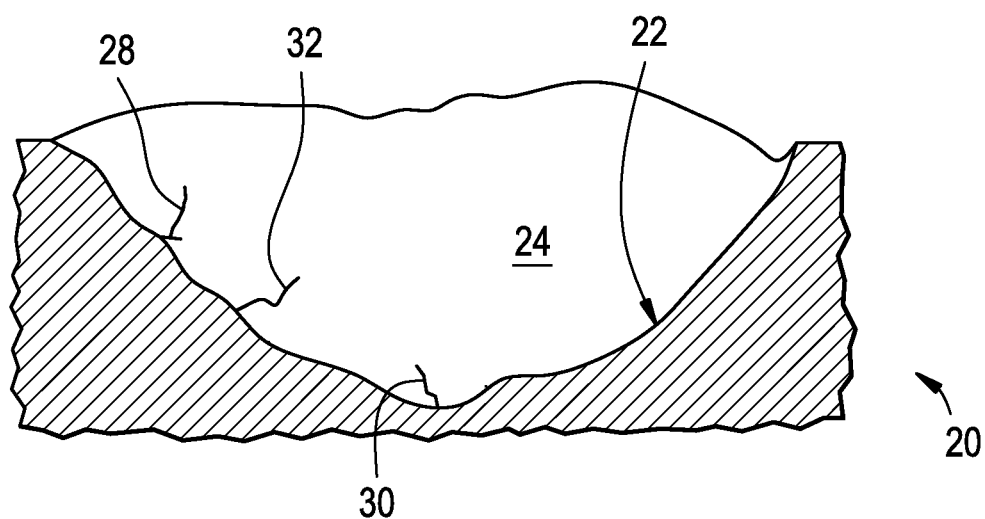
FIG. 2 is a partial cross-sectional view of a substrate having a cavity filled with another metal of the prior art.

FIG. 2 illustrates a substrate 20 including a cavity 22 having a diameter of approximately 0.50". Cavity 22 is filled with another prior art metal, which in the exemplary embodiment shown, takes the form of Nimonic C263. Once again, poor fusion weldability between metal 24 and substrate 20 resulted in strain age cracking (SAC). The SAC occurred in metal 24 adjacent to the WMATFB region. Additional cracking may also occur in other regions of metal 24 as a result of SAC. As shown, the SAC resulted in the formation of cracks 28, 30, and 32. Crack 28 has a length of approximately 0.041", crack 30 has a length of approximately 0.032", and crack 32 has a length of approximately 0.56". Cracks 28, 30, and 32 exceed desired crack length limits. In a manner similar to that described above, cracks of such magnitude could result in metal 24 becoming dislodged from cavity 22.

Figure 3:
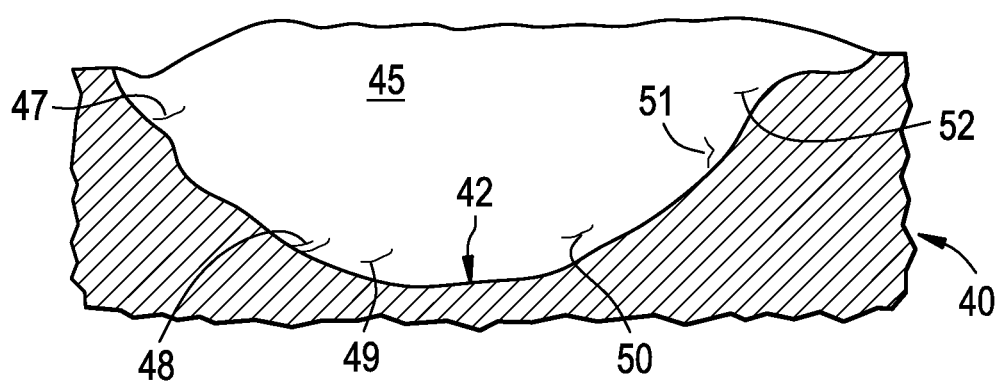
FIG. 3 is a partial cross-sectional view of a substrate having a cavity filled with a metal in accordance with an exemplary embodiment.

FIG. 3 illustrates a substrate 40 having a cavity 43 that is approximately 0.50" in diameter. Cavity 43 is filled with a metal 45 having a metal chemistry in accordance with an exemplary embodiment. Metal 45 is resistant to SAC. That is, while metal 45 does exhibit a number of cracks 47-52, each crack 47-52 is substantially smaller than the desired crack length limit. For example, crack 47 is approximately 0.020" in length, crack 48 is approximately 0.010" in length, crack 49 is approximately 0.014" in length, crack 50 is approximately 0.010" in length, crack 51 is approximately 0.012" in length, and crack 52 is approximately 0.008" in length. Experience has shown that such cracks are less likely to lead to metal failure. As such, metal 45 can be employed, in accordance with an exemplary embodiment, as a filler metal for repairing cavities that were previously considered unrepairable using conventional methods and filler metals.

In accordance with an exemplary embodiment, metal 45 includes a metal chemistry having an amount of chromium of between about 9.0 and about 16% by weight, an amount of cobalt of between about 7.0% and about 14% by weight, an amount of molybdenum of between about 10% and about 20% by weight, an amount of iron of between about 1.0% and about 5.0% by weight, an amount of aluminum of between about 0.05% and about 0.75% by weight, an amount of titanium of between about 0.5% and about 2.0% by weight, an amount of manganese not to exceed about 0.8% by weight, an amount of carbon of between about 0.02% and about 0.10% by weight, an amount of a titanium+aluminum alloy of between about 0.55% and about 2.75% by weight, and the remainder including an amount of nickel.

In accordance with an aspect of an exemplary embodiment, the titanium+aluminum alloy forms a precipitated strengthened gamma prime phase, $Ni_3(Al, Ti)$ of metal 45. The precipitated strengthened gamma phase enhances an overall gamma prime content of metal 45 that resists SAC when welding superalloys. Further, the use of the titanium+aluminum alloy facilitates maintaining the WMATFB below the threshold line of $Al=-0.5Ti+3$ in a superalloy strain age cracking susceptibility chart (SACSC) in terms of Al and Ti, thereby enhancing weldability of super alloys. In further accordance with an aspect of an exemplary embodiment, the term "titanium+aluminum alloy" should be understood to describe an element that is distinct from the amount of titanium and the amount of aluminum and which represents a substance of two intimately mixed metals. Intimately mixed should be understood to include, for example, fusion, electrodeposition, and the like.

In accordance with one aspect of the exemplary embodiment, the amount of chromium is between about 11% and about 14% by weight, the amount of cobalt is between about 10% and about 11% by weight, the amount of molybdenum is between about 14% and about 16% by weight, the amount of iron is between about 2.0% and about 4.0% by weight, the amount of aluminum is between about 0.15% and about 0.3% by weight, the amount of titanium is between about 1.0% and about 1.2% by weight, the amount of carbon is between about 0.02% and about 0.10% by weight, and the amount of a titanium+aluminum alloy is between about 1.2% and 1.4% by weight, with the remainder including an amount of nickel.

The term "about" is intended to include the degree of error associated with measurement of the particular quantity based upon the equipment available at the time of filing the application. For example, "about" can include a range of +/−8% or 5%, or 2% of a given value.

In accordance with another aspect of the exemplary embodiment the amount of chromium is about 12.5% by weight, the amount of cobalt is about 10.5% by weight, the amount of molybdenum is about 15.0% by weight, the amount of iron is about 3.0% by weight, the amount of aluminum is about 0.25% by weight, the amount of titanium is about 1.1% by weight, the amount of carbon is about 0.06% by weight, and the amount of a titanium+aluminum alloy is about 1.65% by weight with the remainder including an amount of nickel.

The particular metal chemistry for metal 45 allows for the repair cavities, pits, etc. that are larger than were previously possible. More specifically, the particular metal chemistry has been shown to exhibit acceptable strength, wear and adhesion properties when used to repair cavities of up to 1" or more in diameter. By allowing for repair of larger cavities, pits, etc., the particular filler metal chemistry allows for the repair and re-use of turbomachine components that would previously have been discarded. Thus, the particular metal chemistry leads to a substantial cost savings. At this point it should be understood that while discussed in terms of the repair of turbomachinery, the particular metal chemistry can be used to repair a wide array of components. That is, metal 45 is compatible with a wide range of materials such as steels, stainless steels and other super alloys such as GTD111™, GTD444™ and R108™. That is, the metal in accordance with the exemplary embodiment can be employed to join a first member formed stainless steel with a second member formed from stainless steel. The metal in accordance with the exemplary embodiment can likewise be employed to join a first member formed from a super alloy including one of GTD111™, GTD444™ and R108™, with second member formed from a super alloys including one of GTD111™, GTD444™, and R108™. In accordance with another aspect of the exemplary embodiment, the metal may be devoid of Boron (B); Zirconium (Zr) and/or Hafnium (Hf).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A metal chemistry comprising:
   an amount of chromium of between about 9.0 and about 16% by weight;
   an amount of cobalt by weight of between about 7.0% and about 14% by weight;
   an amount of molybdenum of between about 10% and about 20% by weight;
   an amount of iron of between about 1.0% and about 5.0% by weight;
   an amount of aluminum of between about 0.15% and about 0.3% by weight;

an amount of titanium of between about 0.5% and about 2.0% by weight;

an amount of manganese not to exceed about 0.8% by weight;

an amount of carbon of between 0.02% and about 0.10% by weight;

an amount of a titanium+aluminum alloy of between about 0.55% and about 2.75% by weight; and an amount of nickel, wherein the metal chemistry is devoid of hafnium.

2. The metal chemistry according to claim 1, wherein the amount of chromium is between about 11% and about 14% by weight.

3. The metal chemistry according to claim 2, wherein the amount of chromium is about 12.5% by weight.

4. The metal chemistry according to claim 1, wherein the amount of cobalt is between about 10% and about 11% by weight.

5. The metal chemistry according to claim 4, wherein the amount of cobalt is about 10.5% by weight.

6. The metal chemistry according to claim 1, wherein the amount of molybdenum is between about 14% and about 16% by weight.

7. The metal chemistry according to claim 6, wherein the amount of molybdenum is about 15.0% by weight.

8. The metal chemistry according to claim 1, wherein the amount of iron is between about 2.0% and about 4.0% by weight.

9. The metal chemistry according to claim 8, wherein the amount of iron is about 3.0% by weight.

10. The metal chemistry according to claim 1, wherein the amount of aluminum is about 0.25% by weight.

11. The metal chemistry according to claim 1, wherein the amount of titanium is between about 1.0% and about 1.2% by weight.

12. The metal chemistry according to claim 11, wherein the amount of titanium is about 1.1% by weight.

13. The metal chemistry according to claim 1, wherein the amount of carbon is between about 0.02% and about 0.10% by weight.

14. The metal chemistry according to claim 13, wherein the amount of carbon is about 0.06% by weight.

15. The metal chemistry according to claim 1, wherein the amount of the titanium+aluminum alloy is between about 1.2% and about 1.4% by weight.

16. The metal chemistry according to claim 15, wherein the amount of the titanium+aluminum alloy is about 1.65% by weight.

17. The metal chemistry according to claim 1, wherein the metal chemistry is in the form of a filler rod configured and disposed to join components formed from at least one superalloy.

18. A metal chemistry comprising:

an amount of chromium of between about 9.0 and about 16% by weight;

an amount of cobalt by weight of between about 7.0 and about 14% by weight;

an amount of molybdenum of between about 14% and about 20% by weight;

an amount of iron of between about 1.0% and about 5.0% by weight;

an amount of aluminum of between about 0.05% and about 0.75% by weight;

an amount of titanium of between about 0.5% and about 2.0% by weight;

an amount of manganese not to exceed about 0.8% by weight;

an amount of carbon of between 0.02% and about 0.10% by weight;

an amount of a titanium+aluminum alloy of between about 0.55% and about 2.75% by weight; and an amount of nickel.

19. The metal chemistry according to claim 18, wherein the metal chemistry is devoid of hafnium.

20. A metal chemistry comprising:

an amount of chromium of between about 9.0 and about 16% by weight;

an amount of cobalt by weight of between about 7.0 and about 14% by weight;

an amount of molybdenum of between about 10% and about 20% by weight;

an amount of iron of between about 1.0% and about 5.0% by weight;

an amount of aluminum of between about 0.05% and about 0.75% by weight;

an amount of titanium of between about 1.0% and about 1.2% by weight;

an amount of manganese not to exceed about 0.8% by weight;

an amount of carbon of between 0.02% and about 0.10% by weight;

an amount of a titanium+aluminum alloy of between about 0.55% and about 2.75% by weight; and an amount of nickel, wherein the metal chemistry is devoid of hafnium.

* * * * *